(12) United States Patent
Yoshida et al.

(10) Patent No.: US 7,762,277 B2
(45) Date of Patent: Jul. 27, 2010

(54) HYDRAULIC PRESSURE SUPPLYING DEVICE FOR TRANSMISSION

(75) Inventors: Shunsuke Yoshida, Wako (JP); Tetsuya Mochizuki, Wako (JP); Naohisa Morishita, Wako (JP); Yoshimichi Tsubata, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 746 days.

(21) Appl. No.: 11/214,893

(22) Filed: Aug. 31, 2005

(65) Prior Publication Data

US 2006/0042700 A1 Mar. 2, 2006

(30) Foreign Application Priority Data

Sep. 1, 2004 (JP) ............................. 2004-254452

(51) Int. Cl.
*F01B 25/02* (2006.01)
*E03B 7/07* (2006.01)
*F16H 57/04* (2010.01)

(52) U.S. Cl. .................. 137/565.33; 137/545; 475/159

(58) Field of Classification Search ............ 137/565.33, 137/545, 550, 515.7; 475/159
See application file for complete search history.

(56) References Cited

U.S. PATENT DOCUMENTS

| 1,032,502 | A | * | 7/1912 | Pribil ........................... 184/76 |
| 3,964,585 | A | * | 6/1976 | Murayama et al. ........ 192/87.13 |
| 5,996,688 | A | * | 12/1999 | Schultz et al. ................. 166/72 |
| 6,142,037 | A | * | 11/2000 | Botosan et al. ........... 74/606 R |
| 6,364,431 | B1 | * | 4/2002 | Yabuki et al. ............. 303/119.2 |
| 6,688,325 | B2 | * | 2/2004 | Hettinger .................... 137/270 |

FOREIGN PATENT DOCUMENTS

| JP | 11-287316 | 10/1999 |
| JP | 11287316 A | * 10/1999 |
| JP | 2002-364737 | 12/2002 |
| JP | 2004-60572 | 2/2004 |

\* cited by examiner

*Primary Examiner*—Stephen Hepperle
*Assistant Examiner*—Atif H Chaudry
(74) *Attorney, Agent, or Firm*—Westerman, Hattori, Daniels & Adrian, LLP

(57) ABSTRACT

In a hydraulic pressure supplying device for a transmission including a first oil pump adapted to be driven by a main shaft of the transmission, at least one second oil pump adapted to be driven by suitable means, and a check valve provided between the discharge side of the first oil pump and the discharge side of the second oil pump to prevent the flow of oil from the first oil pump to the second oil pump, a first filter is provided between the second oil pump and the check valve.

4 Claims, 3 Drawing Sheets

HYDRAULIC PRESSURE SUPPLYING DEVICE FOR TRANSMISSION

BACKGROUND OF THE INVENTION

1. Field of the Invention

The present invention relates to a hydraulic pressure supplying device for a transmission, and more particularly to a hydraulic pressure supplying device for a transmission in a hybrid vehicle or the like having a main oil pump and an auxiliary oil pump such as an electric oil pump.

2. Description of the Related Art

There has recently been developed a vehicle having an engine adapted to be temporarily stopped for the purposes of improvement in fuel economy and emission reduction of carbon dioxide, such as a hybrid vehicle and a vehicle having an idling stop engine. In an automatic transmission (AT) mounted on such a vehicle, a mechanical oil pump for supplying oil to a hydraulic control unit in the automatic transmission is provided in interlocking relationship with the engine, so that the mechanical oil pump is stopped when the engine is stopped. In a hybrid vehicle, for example, an electric oil pump for supplying oil to the hydraulic control unit in an auxiliary manner is therefore provided to normally perform hydraulic control at starting of the vehicle.

Japanese Patent Laid-open No. Hei 11-287316 discloses a hydraulic pressure supplying device for a transmission including a first oil pump (main oil pump) adapted to be driven by a main shaft of the transmission, a second oil pump (auxiliary oil pump) adapted to be driven by an electric motor, and a check valve provided between the discharge side of the second oil pump and the discharge side of the first oil pump to prevent the flow of oil from the first oil pump to the second oil pump. In the hydraulic pressure supplying device disclosed in this publication, the first oil pump and the second oil pump are connected to individual strainers.

The hydraulic pressure supplying device disclosed in Japanese Patent Laid-open No. Hei 11-287316 mentioned above has the following problem. In the case that foreign matter is generated in the second oil pump because of chip scratching or the like or in the case that foreign matter is generated because of failure or the like of the hydraulic control unit in the transmission, there is a possibility that the foreign matter may cause adverse effects on the function of the check valve or the first or second oil pump.

SUMMARY OF THE INVENTION

It is therefore an object of the present invention to provide a hydraulic pressure supplying device for a transmission which can prevent foreign matter from entering a check valve or first and second oil pumps connected to the check valve.

In accordance with an aspect of the present invention, there is provided a hydraulic pressure supplying device for a transmission including a first oil pump adapted to be driven by a main shaft of the transmission; at least one second oil pump adapted to be driven by suitable means; a check valve provided between the discharge side of the first oil pump and the discharge side of the second oil pump to prevent the flow of oil from the first oil pump to the second oil pump; and a first filter provided between the second oil pump and the check valve.

With this configuration, it is possible to prevent that foreign matter generated in the case of failure of the second oil pump may cause damage to the check valve, the first oil pump, and a hydraulic control unit in the transmission.

Preferably, the hydraulic pressure supplying device further includes a second filter provided between the first oil pump and the check valve. Accordingly, it is possible to prevent that foreign matter generated in the first oil pump and the hydraulic control unit may cause damage to the second oil pump.

Preferably, the hydraulic pressure supplying device further includes a third filter provided between the second oil pump and a strainer provided in the transmission. Accordingly, even when foreign matter enters the device in the case of installing parts or repairing the strainer, it is possible to prevent that the foreign matter may cause damage to the first and second pumps and the hydraulic control unit in the transmission.

Preferably, the hydraulic pressure supplying device further includes a suction pipe connected to the suction side of the second oil pump, and the third filter is provided in the suction pipe. With the structure that the third filter is provided in the suction pipe, the positioning and installation of the third filter can be easily performed.

Preferably, the hydraulic pressure supplying device further includes a delivery pipe connected to the discharge side of the second oil pump, and the first and second filters are provided in the delivery pipe. With the structure that the first and second filters are provided in the delivery pipe, the positioning and installation of the first and second filters can be easily performed.

More preferably, the second oil pump, the suction pipe, and the delivery pipe are removably mounted on a transmission case from the outside of the transmission. With this configuration, even if clogging of the filters or lodging of the check valve occurs, the replacement or maintenance of parts can be easily performed.

The above and other objects, features and advantages of the present invention and the manner of realizing them will become more apparent, and the invention itself will best be understood from a study of the following description and appended claims with reference to the attached drawings showing some preferred embodiments of the invention.

DETAILED DESCRIPTION OF THE PREFERRED EMBODIMENTS

Figure 1:
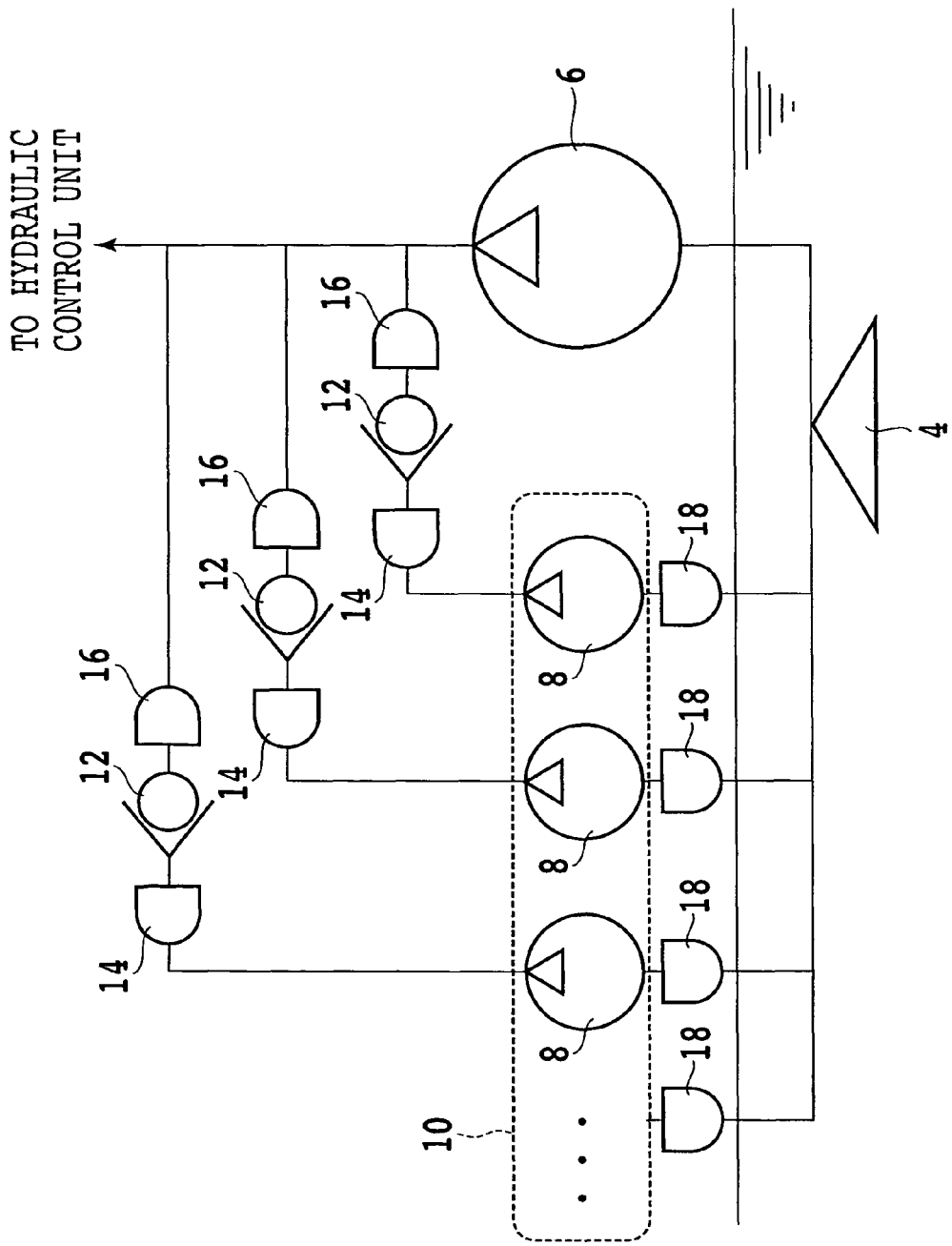
FIG. 1 is a schematic diagram showing a system configuration of the present invention.

FIG. 1 shows a system configuration of the hydraulic pressure supplying device according to the present invention. A first oil pump 6 is driven by a main shaft of a transmission. Reference numeral 10 denotes a second oil pump group consisting of a plurality of second oil pumps 8. Each second oil pump 8 is driven by suitable driving means such as an electric motor. This suitable driving means includes an auxiliary engine or the like provided independently of a main engine for driving a vehicle. The suction side of the first oil pump 6 and the suction side of each second oil pump 8 are connected to a strainer 4 of the transmission.

A check valve 12 is interposed between the discharge side of the first oil pump 6 and the discharge side of each second oil pump 8 to prevent the flow of oil from the first oil pump 6 to the second oil pump 8. The check valve 12 permits the flow of oil from each second oil pump 8 to the discharge side of the first oil pump 6. Accordingly, the oil discharged from the first oil pump 6 and the oil discharged from each second oil pump 8 are supplied together to a hydraulic control unit in the transmission.

A first filter 14 is provided between each second oil pump 8 and the corresponding check valve 12. Accordingly, it is possible to prevent that foreign matter generated in the case of failure of any one of the second oil pumps 8 may cause damage to the corresponding check valve 12, the first oil pump 6, and the hydraulic control unit in the transmission. A second filter 16 is provided between the first oil pump 6 and each check valve 12 connected to the corresponding second oil pump 8. Accordingly, it is possible to prevent that foreign matter generated in the first oil pump 6 and the hydraulic control unit may cause damage to each check valve 12.

Further, a third filter 18 is provided between the strainer 4 and each second oil pump 8. Accordingly, even when foreign matter enters the device in the case of installing parts or repairing the strainer 4, it is possible to prevent that the foreign matter may cause damage to the first and second oil pumps 6 and 8 and the hydraulic control unit in the transmission.

Figure 2:
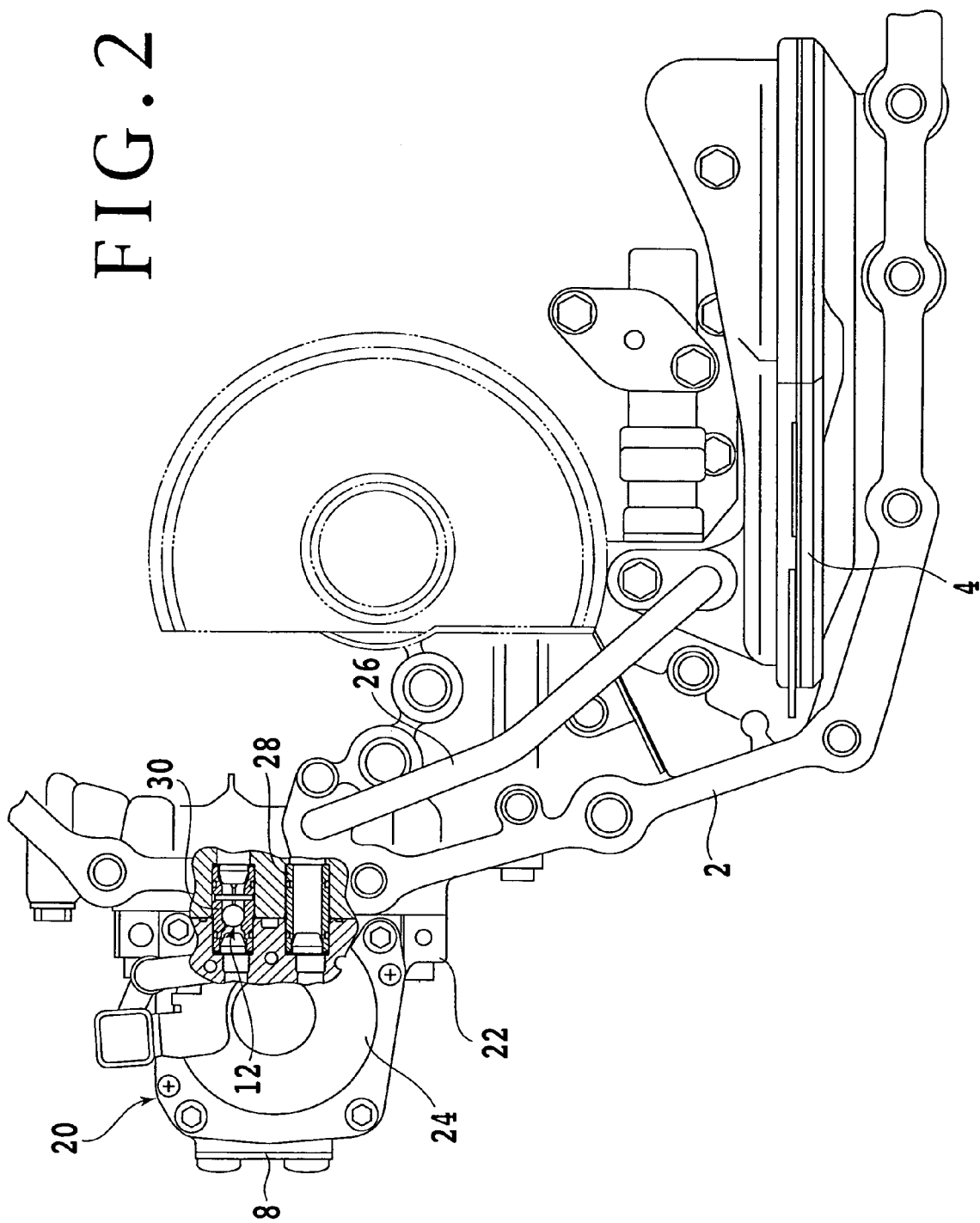
FIG. 2 is a side view of a transmission with a second oil pump assembly in the condition where a transmission case is partially removed.
Figure 3:
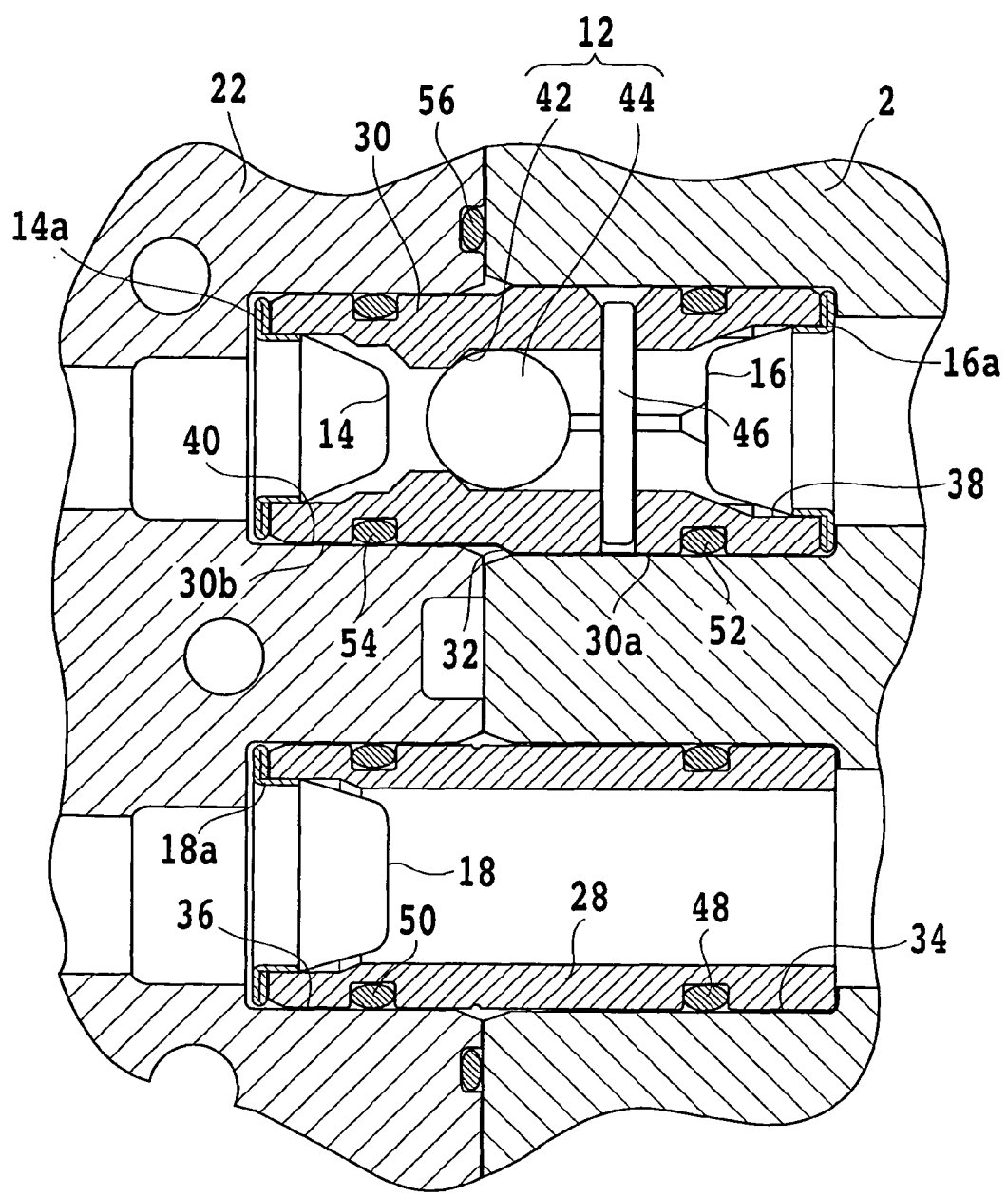
FIG. 3 is an enlarged sectional view showing oil inlet and outlet portions of the second oil pump assembly shown in FIG. 2.

The structure of the hydraulic pressure supplying device according to the present invention will now be described with reference to FIGS. 2 and 3. FIG. 2 is a side view of a transmission including a second oil pump assembly 20, and FIG. 3 is an enlarged sectional view showing in detail an oil inlet portion and an oil outlet portion of the second oil pump assembly 20. As shown in FIG. 2, the second oil pump assembly 20 is detachably mounted on a transmission case 2.

The second oil pump assembly 20 includes an oil pump base 22, a second oil pump 8 mounted on the oil pump base 22, and an electric motor 24 for driving the second oil pump 8. The oil pump base 22 of the second oil pump assembly 20 is detachably fixed to the transmission case 2 by using a plurality of bolts. The oil from the strainer 4 is introduced through a tube 26 and a suction pipe 28 into the second oil pump 8, and the oil discharged from the second oil pump 8 is supplied through a delivery pipe 30 to the hydraulic control unit in the transmission.

The structure of an oil delivering portion to the second oil pump assembly 20 will now be described in detail with reference to FIG. 3. The suction pipe 28 is accommodated in a pipe mounting hole 34 formed on the transmission case 2 and a pipe mounting hole 36 formed on the oil pump base 22. Similarly, the delivery pipe 30 is accommodated in a pipe mounting hole 38 formed on the transmission case 2 and a pipe mounting hole 40 formed on the oil pump base 22. The delivery pipe 30 has a shoulder portion 32, through which a large-diameter portion 30*a* and a small-diameter portion 30*b* are connected with each other.

To permit the insertion of the delivery pipe 30 having the shoulder portion 32, the pipe mounting hole 38 has a diameter larger than that of the pipe mounting hole 40. The reason for the formation of the shoulder portion 32 on the delivery pipe 30 is to limit the direction of installation of the check valve 12 composed of a valve seat 42 and a ball 44 to one direction. A pin 46 is press-fitted in the delivery pipe 30 to thereby limit the stroke of the ball 44 of the check valve 12. The first filter 14 and the second filter 16 are set at the opposite ends of the delivery pipe 30.

The first and second filters 14 and 16 are formed as mesh filters of stainless steel, for example, and they have flanges 14*a* and 16*a*, respectively. The flange 14*a* of the first filter 14 is sandwiched between one end of the delivery pipe 30 and the bottom of the pipe mounting hole 40. Similarly, the flange 16*a* of the second filter 16 is sandwiched between the other end of the delivery pipe 30 and the bottom of the pipe mounting hole 38. Accordingly, the removal of the first and second filters 14 and 16 from the delivery pipe 30 can be prevented. Similarly, the third filter 18 has a flange 18*a,* and the flange 18*a* is sandwiched between one end of the suction pipe 28 and the bottom of the pipe mounting hole 36, thereby preventing the removal of the third filter 18 from the suction pipe 28.

A pair of O-rings 48 and 50 are provided on the outer circumference of the suction pipe 28 to thereby prevent the leakage of oil flowing in the suction pipe 28 and the suction of the outside air into the suction pipe 28. Similarly, a pair of O-rings 52 and 54 are provided on the outer circumference of the delivery pipe 30 to thereby prevent the leakage of oil flowing in the delivery pipe 30.

Further, an O-ring 56 is provided on the interface between the transmission case 2 and the oil pump base 22 so as to surround the suction pipe 28 and the delivery pipe 30. Accordingly, even if any one of the O-rings 48, 50, 52, and 54 is damaged to cause the leakage of oil flowing in the suction pipe 28 or the delivery pipe 30, the leaked oil can be reliably sealed by the O-ring 56 to prevent the oil leakage from the interface between the oil pump base 22 and the transmission case 2.

According to this preferred embodiment, the second oil pump assembly 20, the suction pipe 28, and the delivery pipe 30 are removably mounted on the transmission case 2 from the outside of the transmission. Accordingly, even if clogging of the filters 14, 16, and 18 or lodging of the check valve 12 occurs, the filters 14, 16, and 18 can be easily replaced or the check valve 12 can be easily repaired.

While the preferred embodiment shown in FIGS. 2 and 3 employs the single second oil pump assembly 20 including the electric motor 24, the present invention is not limited to this configuration, but a plurality of second oil pump assemblies may be provided as shown in FIG. 1. In this case, there is a merit such that even if any one of the second oil pump assemblies fails, the remaining second pump assembly or assemblies can be used instead.

The present invention is not limited to the details of the above described preferred embodiments. The scope of the invention is defined by the appended claims and all changes and modifications as fall within the equivalence of the scope of the claims are therefore to be embraced by the invention.

What is claimed is:

1. A hydraulic pressure supplying device for a transmission, comprising:
   a first oil pump adapted to be driven by a main shaft of said transmission;
   at least one second oil pump adapted to be driven by suitable means;
   a check valve provided between the discharge side of said first oil pump and the discharge side of said second oil pump to prevent the flow of oil from said first oil pump to said second oil pump;
   a first filter provided between said second oil pump and said check valve;
   second filter provided between said first oil pump and said check valve; and
   a delivery pipe connected to the discharge side of said second oil pump, said delivery pipe having said check valve and said first and second filters provided therein,
   wherein an oil pump base of said second oil pump is mounted on a transmission case such that a cavity is formed between said transmission case and said oil pump base when said oil pump base is mounted,
   wherein said cavity is defined by a first mounting hole, formed in said transmission case, said first mounting hole having a first diameter, and a second mounting hole, formed in said oil pump base, said second mounting hole having a second diameter, wherein said delivery pipe is removably mounted in said cavity, wherein said second diameter is smaller than said first diameter, wherein said delivery pipe has a shoulder portion connecting a large-diameter portion and a small-diameter portion, wherein said large-diameter portion is fitted in said first mounting hole and said small-diameter portion is fitted in said second mounting hole, and wherein said second oil pump and said delivery pipe are removably mountable directly on said transmission case from outside of said transmission.

2. The hydraulic pressure supplying device according to claim 1, further comprising a strainer provided in said transmission and a third filter provided between said second oil pump and said strainer.

3. The hydraulic pressure supplying device according to claim 2, further comprising a suction pipe connected to the suction side of said second oil pump;

said third filter being provided in said suction pipe.

4. The hydraulic pressure supplying device according to claim 3, wherein said oil pump base is mounted on said transmission case such that a second cavity is formed between said transmission case and said oil pump base when said oil pump base is mounted, wherein said second cavity is defined by a third mounting hole, formed in said transmission case, and a fourth mounting hole, formed in said oil pump base, wherein said suction pipe is removably mounted in said second cavity, and wherein said suction pipe is removably mountable on said transmission case from the outside of said transmission.

* * * * *